Reissued July 16, 1935 Re. 19,645

UNITED STATES PATENT OFFICE 19,645

METHOD FOR PRODUCING DIAZODINITROPHENOL AND THE PRODUCT THEREOF

Roy S. Hancock, Cambridge, Mass., and Leslie C. Pritchett, Kenvil, N. J., assignors to Hercules Powder Company, Wilmington, Del., a corporation of Delaware No Drawing. Original No. 1,952,591, dated March 27, 1934, Serial No. 620,529, July 1, 1932. Application for reissue May 22, 1935, Serial No. 22,814

6 Claims. (Cl. 260—69)

This invention relates to a method for the production of diazodinitrophenol and more particularly to a method whereby diazodinitrophenol may be produced directly in a free-flowing form.

Diazodinitrophenol has been known heretofore and methods for its production have been disclosed. Thus, for example, diazodinitrophenol and a method for its production are disclosed in the United States patents to Dehn Nos. 1,404,687, 1,428,011 and 1,460,708. The compound constitutes a very valuable detonating material for use, for example, in charging blasting caps. However, as directly produced by methods heretofore known, it is not free-flowing and hence cannot be readily loaded.

Now in accordance with this invention a novel method is provided for the production of diazodinitrophenol and one in its more specific embodiment of which free-flowing diazodinitrophenol may be prepared directly.

Having now indicated in a general way the nature and purpose of this invention, we will proceed to a more detailed description thereof from the broad and from the more specific standpoints.

From the broad standpoint the method embodying this invention involves the diazotization of a salt of picramic acid by a salt of nitrous acid and an acid. Thus, broadly, this invention involves the diazotization of a picramate by a nitrite and an acid.

More specifically, and especially where the direct production of diazodinitrophenol in a free-flowing form is desired, the acid will be added gradually at a slow rate, or a portion of the acid may be added rapidly at the start with gradual addition of the balance. The rate of addition of the acid, where such is added gradually, following the more specific procedure in accordance with this invention, will depend upon temperature and other variables obtaining during the addition.

In the practical adaptation of this invention any suitable salt of picramic acid, or picramate, may be used. Thus, for example, sodium picramate, ammonium picramate, magnesium picramate, etc., may be used, one being substitutable for the other in equivalent quantities. Likewise, various salts of nitrous acid, or nitrites, may be used, such, for example, as sodium nitrite, potassium nitrite, barium nitrite, etc., being used in substitution for one another in equivalent quantities.

The acid may be any suitable acid for effecting diazotization of the picramate and nitrite, as, for example, hydrochloric acid or equivalent amounts of sulphuric, phosphoric, acetic, etc., acids.

In carrying out the method the picramate and the nitrites will be in solution or in suspension, or partly in solution and partly in suspension in water. Thus, for example, a suspension of sodium picramate with a concentration as high as 9.7% has been successfully diazotized by the method of this invention without indication that the figure is in any way limiting. The solution or suspension will desirably be substantially neutral, and the concentration of the salts, while they may vary widely, will be such desirably as to give efficient and economic results. The temperature during the diazotization will be controlled and will desirably be maintained, by any suitable means, within about the range 10–16° C. Where the acid is added gradually for the production of diazodinitrophenol in a free-flowing form, the addition will be at a relatively slow rate, say, for example, at the rate of about 0.001 gram HCl per minute per gram of sodium picramate, or at equivalent rates for other acids and/or other picramates. As will be understood, however, the most desirable rate of addition of the acid in any given case will depend upon the temperature and other variables, but will readily be determined in a given case by those skilled in the art. Alternative to adding all of the acid gradually a part, say about 25%, may be added rapidly and the balance added gradually.

As illustrative of the practical application of the method in accordance with this invention, for example, about 61.2 pounds (dry weight) of water wet sodium picramate, from which foreign material has been removed, as by screening, say through a 40 mesh screen, is charged into a wooden diazotization tub, fitted with an agitator, with about 90 gallons of water. About 19 pounds of sodium nitrite dissolved in 10 gallons of water are then run into the tub and the agitator started. The temperature is adjusted, by any suitable means, for example, by the addition of ice to say about 15° C. About 40 liters of 1:1 hydrochloric acid are then added, preferably at a rate such as to require about 300 minutes for the addition of the acid. During the course of the run the temperature is maintained at about 15–16° C. by suitable means, as by the addition of ice as required. About five minutes after completion of the addition of the acid the solution is tested with, for example, potassium iodide-starch paper and if a strong positive test is obtained an excess of nitrous acid in the solution is indicated which shows that the diazotization of the sodium picramate has been completed. The agitation is then stopped and the charge dumped, for example, into a suction filter, the mother liquor drawn off and the diazodinitrophenol washed with water to free it from impurities.

Following the above procedure the diazodinitrophenol produced will be in the form of relatively smooth, substantially round or pellet-like discrete particles and will be free flowing without any subsequent treatment and free-flowing diazodinitrophenol may be obtained by varying the above procedure to an extent by adding part of the acid, say for example, 10 liters, quickly at the start with gradual addition of the balance. Where the diazodinitrophenol is not desired in a free-flowing form the acid may be added without any special attention to the rate of addition.

As has been indicated, the procedure given in the above illustration by way of example, may be widely varied without departing from this invention. Likewise, various picramates, nitrites and acids may be used in varying proportions and the conditions of diazotization, as temperature, etc. may be widely varied within operative limits.

As will be obvious, the method in accordance with this invention is not dependent upon the use of any particular form of apparatus, means for cooling, or the like.

What we claim and desire to protect by Letters Patent is:

1. The method for producing diazodinitrophenol in a free flowing form which includes diazotizing a picramate by the gradual addition of an acid thereto in the presence of a nitrite and water.

2. The method for producing diazodinitrophenol in a free flowing form which includes gradually adding an acid to a substantially neutral mixture of a salt of picramic acid and a salt of nitrous acid and water.

3. The method for producing diazodinitrophenol in a free flowing form which includes diazotizing a picramate by the gradual addition of an acid thereto in the presence of a nitrite and water while maintaining the temperature of the reagents within about the range 10°–16° C.

4. The method for producing diazodinitrophenol in a free flowing form which includes gradually adding an acid to a substantially neutral mixture of sodium picramate and sodium nitrite in water.

5. The method for producing diazodinitrophenol in a free flowing form which includes gradually adding an acid to a substantially neutral mixture of a salt of picramic acid and a salt of nitrous acid in water while maintaining the temperature of the reagents within about the range 10°–16° C.

6. Diazodinitrophenol in the form of free-flowing, relatively smooth, pellet-like, discrete particles.

ROY S. HANCOCK.
LESLIE C. PRITCHETT.